Jan. 16, 1968   V. C. VANDERBILT, JR   3,363,455
APPARATUS FOR TESTING THE DIFFERENTIAL OF A MOTOR VEHICLE
Filed March 9, 1965   3 Sheets-Sheet 1
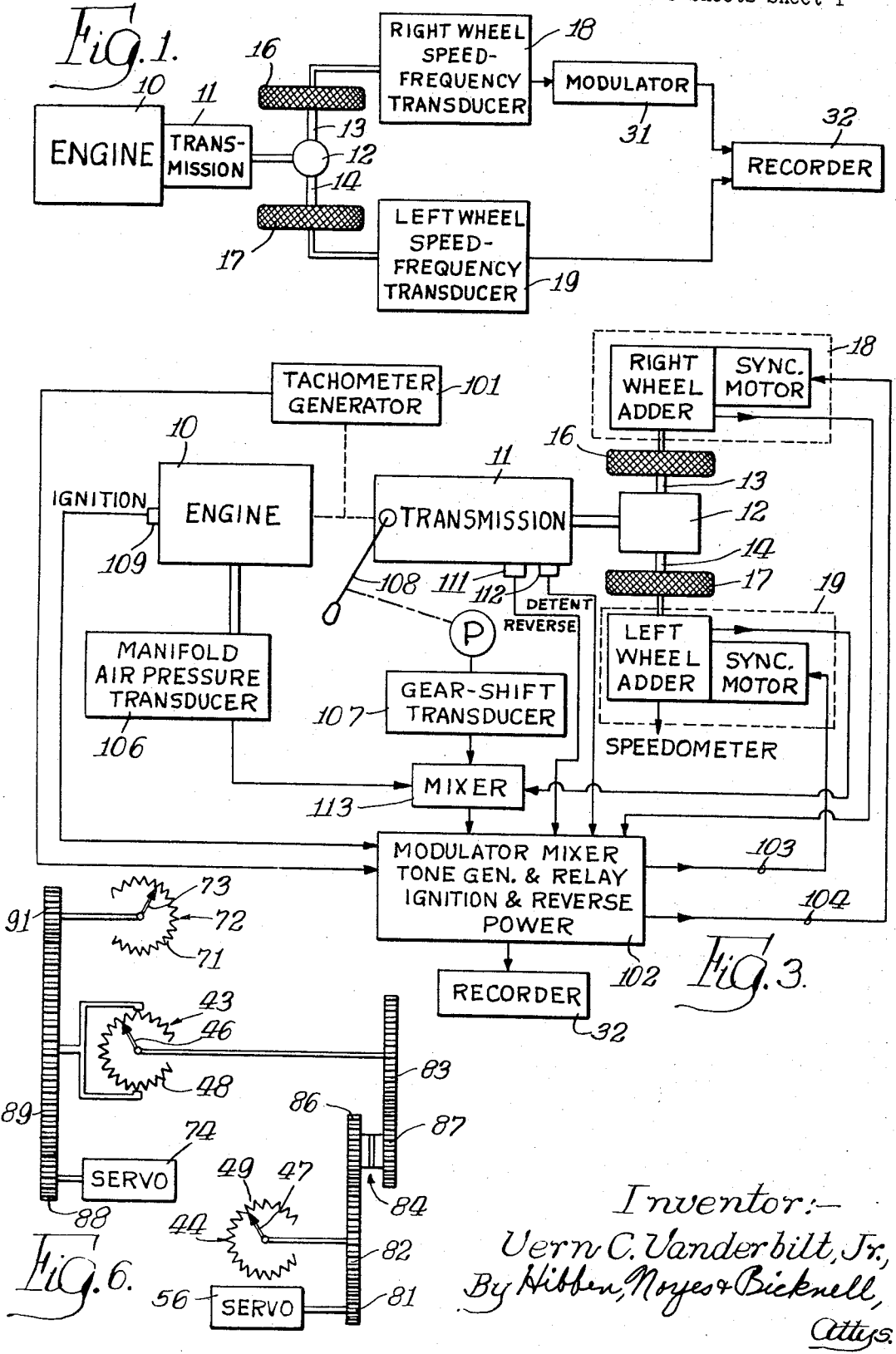
Inventor:—
Vern C. Vanderbilt, Jr.,
By Hibben, Noyes & Bicknell,
Attys.

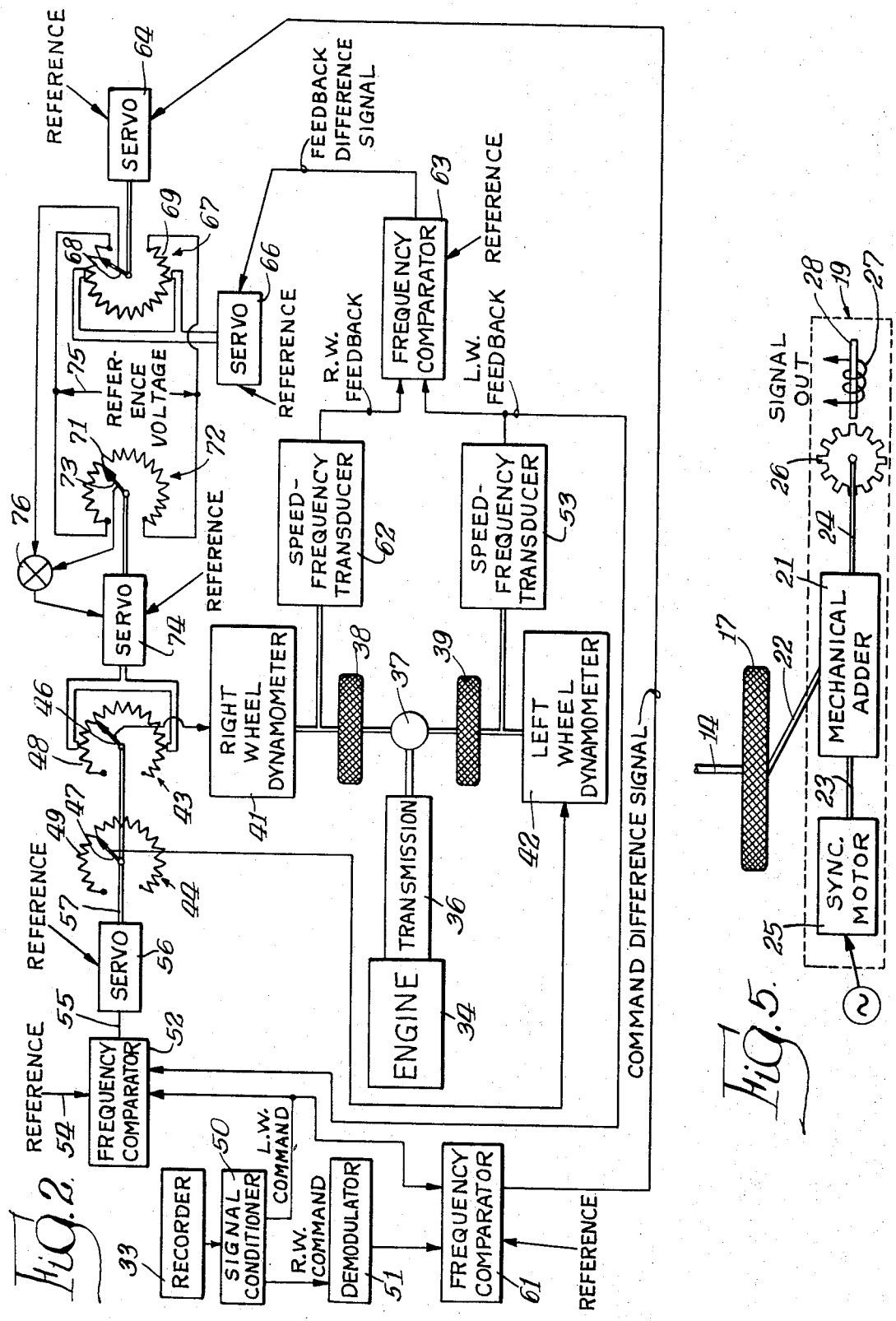

Jan. 16, 1968 V. C. VANDERBILT, JR 3,363,455
APPARATUS FOR TESTING THE DIFFERENTIAL OF A MOTOR VEHICLE
Filed March 9, 1965 3 Sheets-Sheet 3

United States Patent Office 3,363,455
Patented Jan. 16, 1968

3,363,455
APPARATUS FOR TESTING THE DIFFERENTIAL
OF A MOTOR VEHICLE
Vern C. Vanderbilt, Jr., Hagerstown, Ind., assignor to
Dynamic Precision Controls Corporation, Hagerstown,
Ind., a corporation of Indiana
Filed Mar. 9, 1965, Ser. No. 438,210
11 Claims. (Cl. 73—118)

ABSTRACT OF THE DISCLOSURE

This disclosure deals with apparatus for controlling two variable but related qualities using two command signals, each of the command signals being representative of the desired condition of a quality. One of the qualities is directly controlled by the associated command signal whereas the other quality is controlled by offsetting it with respect to the first quality by an amount determined by the difference between the two command signals.

U.S. Patent No. 3,099,154 to Vanderbilt, issued July 30, 1963, describes apparatus for simultaneously controlling a plurality of variable qualities by means of command signals which may, for example, be prerecorded on a magnetic tape. The variable qualities referred to in that patent are dissimilar and generally unrelated qualities, such as the speed of an automobile engine, its manifold air pressure, coolant temperature, and lubricant temperature. While a variation of one of these four qualities may result in a variation in one or more of the other qualities, this is not necessarily true and, further, the variations of two of the qualities need not be simultaneous or generally related.

Where two or more qualities which may vary simultaneously, are to be controlled, and where the qualities are related, a more sophisticated control system is required. For example, where the differential of a motor vehicle is to be tested using two dynamometers, one connected to each of two wheels, of the vehicle and separate command signals are directed to the two dynamometers, a serious hunting problem may arise because the two dynamometers are coupled together through the differential. This can lead to an interchange of energy between the two dynamometers and to the previously mentioned hunting problem.

Accordingly, it is an object of this invention to provide a system for controlling two related qualities, which eliminates problems of hunting or drift of one quality relative to the other.

It is another object of this invention to provide a system for testing the differential of a motor vehicle.

Still another object is to provide a system for recording command signals while operating a motor vehicle and utilizing the command signals to control and test the differential of the same or another motor vehicle.

A still further object is to provide a method for recording command signals and utilizing the command signals to control and test the differential of the same or another motor vehicle.

Other objects and advantages of the invention will become apparent from the following description taken in conjunction with the accompanying figures of the drawings, in which:

FIG. 1 is a block diagram of a system embodying the invention, adapted for recording command signals;

FIG. 2 is a block diagram of a system embodying the invention, adapted to test apparatus using the recorded command signals;

FIG. 3 is a block diagram similar to FIG. 1 but including structure for recording additional command signals;

FIG. 5 illustrates in greater detail a portion of the systems shown in FIGS. 1 to 4; and FIG. 6 illustrates in greater detail a portion of the systems shown in FIGS. 2 and 4.

Figure 4:
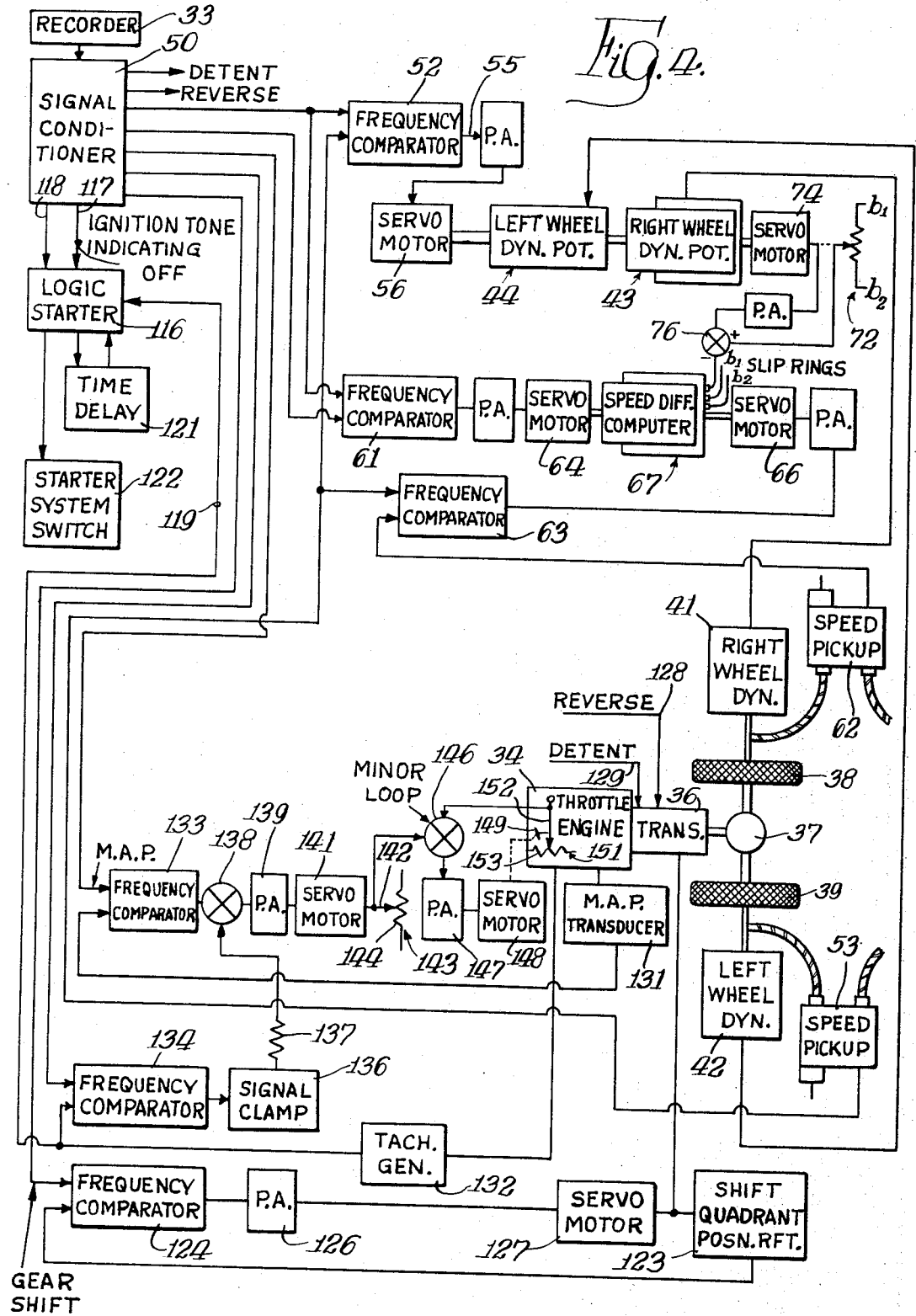
FIG. 4 is a block diagram similar to FIG. 2, adapted to test apparatus using the command signals recorded by the system shown in FIG. 3.

In general, two variable but related qualities are controlled in accordance with this invention by accurately controlling one of the two qualities, and simultaneously controlling the other of the qualities with respect to the one quality.

Where the two qualities are, for example, the speeds of two structures, two command signals are utilized, each command signal being representative of the desired speed of one of the two structures. One of the two command signals is utilized directly to control the speed of its associated structure. The two command signals are also compared and the difference between them is utilized to cause the speed of the other structure to differ from the speed of the directly controlled structure by an amount corresponding to the difference between the two command signals. Thus, the speed of the other structure is always varied with respect to the speed of the directly controlled structure, thereby eliminating any problem of hunting or drift.

In the above specific example wherein the differential of a motor vehicle is being tested, the two simultaneously variable qualities are the speeds of the two wheels connected to the differential, and the two qualities are related in the sense that the two wheels are coupled together through the differential. For a given engine speed, if the speed of rotation of one wheel changes, the speed of rotation of the other wheel must also change oppositely. The system may also be used to control any two qualities wherein one quality may vary but always has a certain ratio to the other quality or where such ratio may continuously vary.

In greater detail, FIG. 1 illustrates a portion of a system for continuously measuring and recording the speed of rotation of two wheels of a motor vehicle, the two wheels being connected together by means of a differential. The motor vehicle includes an engine 10 which is connected through a conventional transmission 11 to a differential 12. The differential 12 is in turn connected by axles 13 and 14 to two wheels 16 and 17 of the vehicle, the two wheels 16 and 17 usually being the two rear wheels of the motor vehicle.

Connected to the two wheels 16 and 17 are two transducers 18 and 19 respectively, for generating electrical signals which are representative of the speed or rate of rotation of the two wheels. It is preferred that the two transducers 18 and 19 be speed-to-frequency transducers of the type illustrated in detail in FIG. 5. The transducer 19, for example, includes a mechanical adder 21 which has two input connections 22 and 23 and one output connection 24. The input connection 22 is connected to the wheel 17 and the other input connection 23 is driven by a motor 25, such as a synchronous electric motor which will run at a constant speed. The output connection 24 of the adder 21 is connected to a magnetic pickup device including, for example, a toothed gear 26 and a coil 27 which is wound around a rod 28 made of a magnetic material.

In the operation of the transducer the speed of rotation of the output connection 24 is equal to the sum of the speeds of the two input connections 22 and 23. If the wheel 17 is stationary and the motor 25 is energized, the gear 26 rotates at the same rates as, or at a rate proportional to, the rate of rotation of the motor 25. If the wheel 17 and the input connection 22 are also rotating, the rate of rotation of the output connection 24 and the gear 26 will be equal or proportional to the sum of the speeds of the wheel 17 and the synchronous motor 25. The frequency of the electrical signal induced in the pickup coil 27 is equal to the rate of rotation of the gear 26 multiplied by the number of teeth on the gear 26, and of course the frequency of the signal in the coil 27 is proportional to the sum of the speed or rotation of the wheel 17 and the motor 25. Assuming again that the wheel 17 is stationary and that the motor 25 is designed to operate at a speed such that frequency of the signal induced in the coil 27, is for example, 200 c.p.s., if the wheel 17 has a forward speed the frequency of the signal in the coil 27 will increase a proportional amount from 200 c.p.s., and, conversely, if the wheel 17 has a reverse rotation, the frequency of the signal induced in the coil 27 will decrease from the zero wheel speed of 200 c.p.s. This arrangement has the advantage that an alternating current signal is produced even though the wheel 17 is stationary and the variation in the frequency of the signal in the coil 27 is directly proportional to the variation in the rate of rotation of the wheel 17.

The transducer 18 shown in FIG. 1 and the speed to frequency transducers to be described with reference to FIG. 2 may be identical to the transducer illustrated in FIG. 5.

When recording the transducer output signals, which are referred to herein as command signals, it is preferred that the signals from the transducers 18 and 19 be recorded on a magnetic tape and that the recording be accomplished on a single track. Since the two command signals are in the same bandwidth, the signal from one of the two transducers, in this instance the transducer 18, is modulated prior to being recorded on the tape. Modulation of the command signal from the transducer 18 is accomplished in a conventional modulator 31 (see FIG. 1) which preferably has a carrier frequency in the audio range, for example, approximately 8,350 c.p.s. The command signal from the transducer 19 and the modulated signal from the modulator 31 are then recorded on a suitable recording mechanism 32.

Since frequency modulation is utilized in the system except for the wide band speed signals of the engine and the right wheel, it is very desirable that the speed of the recorder 32 be essentially constant because of course, a variation in the speed of the recorder will result in a change in signal frequencies when the recorded signals are played back. A conventional tape recording mechanism such as the one known in the trade as Nagra III B is suitable for this purpose. The recording operation just described with regard to FIG. 1 may be accomplished by test driving a motor vehicle on the road and continuously measuring and recording the speed of rotation of both the two wheels connected to the differential. Thereafter, the tape having the speed representative control signals recorded thereon may be played back in a recorder 33 (FIG. 2) which is connected in a playback system for testing the differential of a test vehicle. With reference to FIG. 2, the playback system includes an engine 34 which is again connected by a conventional transmission 36 to a differential 37 to be tested. The differential 37 is again connected to right and left wheels 38 and 39 by suitable axles. Connected to the right wheel 38 is a conventional right wheel dynamometer 41 and connected to the left wheel 39 is another conventional dynamometer 42.

The load control device for the right wheel dynamometer 41 comprises a right wheel dynamometer control potentiometer 43 and the load control device for the left wheel dynamometer 42 comprises a left wheel dynamometer control potentiometer 44. The potentiometers 43 and 44 includes wipers 46 and 47 and resistance elements 48 and 49, respectively, and the loads imposed by the dynamometers on the two wheels are determined by the positions of the wipers 46 and 47 relative to the associated resistance elements 48 and 49.

While dual ganged rotary control potentiometers may be preferred for each dynamometer, only one potentiometer for each dynamometer is shown for simplicity of illustration.

The command signals, which were recorded in the system shown in FIG. 1 are played back by the recorder 33 and fed to a signal conditioner 50 which may include suitable filters for separating the signals. The modulated right wheel signal is fed to a demodulator circuit 51 which removes the carrier signal.

The left wheel command signal is fed to a frequency comparator circuit 52 which also receives a variable frequency feedback signal from a speed to frequency transducer 53 which may again be identical with the transducer circuit shown in the FIG. 5. The transducer 53 is connected to the wheel 39 and the frequency of the feedback signal is representative of the rate of rotation of the wheel 39 during the playback operation. The frequency comparator circuit 52 may be similar to the frequency comparator circuit disclosed in the aforementioned Vanderbilt Patent No. 3,099,154 and in pending U.S. patent application Ser. No. 394,227, filed Sept. 3, 1964, by W. F. Van Ostrand, entitled, "Control System." The frequency comparator circuit 52 receives the left wheel command signal and the left wheel feedback signal, compares the frequencies of the two signals, and develops a left wheel error signal at its output connection 55. The signal developed by the frequency comparator circuit 52 comprises a direct current voltage having an alternating current component. The AC component has the same period as that of a reference voltage on an input 54 and is either in phase or out of phase with the reference voltage. The error signal has a peak-to-peak value that is proportional to the frequency difference between the command and feedback signals, and a phase that indicates which of the two signals has the higher frequency. For example, when the frequency of the command signal is exactly the same as the frequency of the feedback signal, the error signal comprises a steady DC voltage. However, when the command signal frequency is higher than the feedback signal frequency, the phase of the error signal may have the same phase as the phase of the reference signal and its amplitude is proportional to the amount of the frequency difference. On the other hand, when the frequency of feedback signal is higher than the frequency of the command signal, the phase of the error signal opposite the phase of the reference signal and again its amplitude is proportional to the frequency difference.

The error signal from the frequency comparator circuit 52 is fed to a servo motor 56 which may be a conventional two phase motor. The previously referred to reference voltage is connected to the reference winding of the motor 56 and the error signal is connected to the control winding of the motor 56, and in accordance with well known servo motor theory, when the phase of the error signal is the same as that of the reference voltage the servo motor will rotate in one direction and when the phase of the error signal is opposite that of the reference voltage the servo motor will rotate in the opposite direction. The rate of rotation is dependent upon the amplitude of the error signal, and when the error signal amplitude is zero, which is representative of the fact that the feedback signal frequency is equal to the command signal frequency, motor armature is stationary.

The output shaft of the servo motor 56, indicated by the reference numeral 57, is connected to the wiper 47 of the left wheel dynamometer control potentiometer 44, and as previously stated, the load imposed on the left wheel 39 by the dynamometer 42 is dependent upon the relative positions of the wiper 47 and the resistance element 49 which in turn is dependent upon the error signal from the comparator circuit 52. Further, the construction is such that the servo motor 56 tends to move the wiper 47 in the direction to eliminate the error signal. This is accomplished by moving the wiper 47 of the control potentiometer 44 to the position where the frequency of the feedback transducer 53 connected to the left wheel 39 is equal to the frequency of the left wheel command signal from the recorder 33. Such operation is generally similar to the operation of the systems described in the previously referred to patent and patent application.

To summarize, that if, during the recording operation, the rate of rotation of the left wheel 17 changes, the frequency of the left wheel command signal changes correspondingly. During the playback operation, if the speed of rotation of the left wheel 39 is not, at any instance, exactly equal to the rate of rotation of the wheel 17, the comparator circuit 52 will develop an error signal and cause a change in the load imposed by the dynamometer 42 on the wheel 39 in such a manner as to make the wheel 39 rotate at exactly the same speed as the wheel 17. Therefore, the system is such that the rate of rotation of the wheel 39 exactly follows the rate of rotation of the wheel 17.

To control the right wheel 38 during the playback operation, the left wheel command signal and the demodulated right wheel command signal are fed to another frequency comparator circuit 61 which may be similar to the frequency comparator circuit 52. The comparator circuit 61 provides a command difference signal, having a phase and amplitude representative of the difference in frequency between the two command signals and which of the two command signals has the higher frequency.

Further, another speed to frequency transducer 62, which may also be similar to the transducer circuit illustrated in FIG. 5, is connected to the wheel 38 and generates a right wheel feedback signal having a frequency which is representative of the speed of the wheel 38. The left wheel feedback signal from the transducer 53 and the right wheel feedback signal from the transducer 62 are fed to still another frequency comparator circuit 63, which again may be similar to the frequency comparator circuits 52 and 61, and which provides a feedback difference signal having a phase representative of which of the frequencies from the transducers 53 and 62 is the highest and an amplitude representative of the magnitude of the frequency difference.

The command difference signal is compared with the feedback difference signal and the resultant error signal is used to control the right wheel dynamometer 41. Thus, the command difference signal from the frequency comparator circuit 61 is fed to the control winding of a servo motor 64 which has its reference winding connected to the reference voltage, and the feedback difference signal appearing at the output of the frequency comparator circuit 63 is connected to the control winding of still another servo motor 66 which also has its reference winding connected to the reference voltage. The output shafts of the two servo motors 64 and 66 are connected to a speed difference potentiometer 67, the output shaft of the servo motor 64 being shown as connected to the wiper 68 and the output shaft of the servo motor 66 being shown as connected to the potentiometer case which carries the resistance element 69 of the potentiometer 67. The terminals of the resistance element 69 are connected to the terminals of the resistance element 71 of a bridge potentiometer 72, the case which carries the resistance element 71 in this instance being fixed in position. The wiper 73 of the bridge potentiometer 72 is mechanically connected to be rotated by still another servo motor 74. Further, the reference voltage is connected to the reference winding of the servo motor and a voltage preferably the previously referred to reference voltage, is connected across the conductors connecting the resistance elements of the two potentiometers 67 and 72, as indicated at 75, thereby forming a resistance bridge configuration. The electrical signals appearing on the wipers 68 and 73 of the potentiometers 67 and 72 are connected to a circuit 76 which combines the signals and the output of the circuit 76 is connected to the motor 74 which responds to a difference in the voltages on the wipers 68 and 73. Energization of the motor 74 moves the wiper 73 in such a manner as to bring the bridge circuit back into a balanced condition.

The armature shaft of the servo motor 74 is also connected to the potentiometer case which carries the resistance element 48 of the right wheel dynamometer control potentiometer 43, and the wiper 46 of the potentiometer 43 is connected to the armature shaft of the servo motor 56, which also rotates the wiper 47 of the left wheel dynamometer control potentiometer 44. Thus, energization of the motor 56 will simultaneously move wipers 46 and 47 by equal amounts.

In the operation of the system shown in FIGS. 1 and 2, assume that a record has been made of a motor vehicle while it is being operated on a highway, and that during a portion of the recording operation the vehicle traveled over a road which had a steady or constant curve to the right. The left wheel command signal may indicate, for example, forty arbitrarily chosen speed units and the right wheel command signal may indicate, for example, thirty-six speed units. Assume, also that on playback, left and right wheel feedback signals also represent forty and thirty-six speed units, respectively. The error signal from the comparator 52 will in these circumstances have zero amplitude because the two input signals are equal, and consequently the potentiometer 44 and the dynamometer 42 will hold the left wheel 39 speed steady at forty units.

The comparator 61 will indicate a command difference of four units and the comparator 63 will indicate a feedback difference of four units, and the two difference signals will indicate by their phase that the left wheel has the higher speed. The two servo motors 64 and 66 will rotate at equal rates because the two difference signals are equal, and therefore the position of the wiper 68 relative to the resistance element 69 will not change.

Assuming that the bridge was initially balanced, the alternating current voltages on the wipers 68 and 73 will be equal and will be subtracted from each other in the circuit 76. With a zero error signal to the motor 74, the wiper 73 will be held stationary relative to the resistance element 71 and the case and the resistance element 48 of the potentiometer 43 also will be held stationary. Since the relative positions of the wiper and the resistance element of each dynamometer control potentiometer are not changed, the speeds of the two wheels 38 and 39 will also be held steady at this speed.

If the curve in the road should suddenly become slightly sharper and the left wheel command and feedback signals nevertheless remain at forty units but the right wheel command signal drops to thirty-five units while the right wheel feedback signal remains at thirty-six units the setting of the potentiometer 44 and the dynamometer 41 will remain unchanged. The command difference signal will now indicate a difference of five units while the feedback difference signal will continue to indicate a difference of four units. The servo motor 64 will therefore have a higher speed than the servo motor 66 and consequently the wiper 68 will move relative to the element 69, and the voltage on the wiper 68 will gradually change while the voltage on the wiper 73 initially remains the same. The bridge circuit thus becomes unbalanced and an error signal at the output of the circuit 76 energizes the motor 74 such that the wiper 73 is moved to bring the bridge back to a balanced condition. Since the motor 74 also moves the resistance element 48 of the potentiometer 43, the voltage on the wiper 46 also changes and the connection from the potentiometer 43 to the dynamometer 41 is such that a greater load is imposed on the wheel 38 and it slows down slightly. The right wheel feedback signal then drops to thirty-five units, the feedback difference signal indicates a difference of five units, which is the same as the command difference and therefore relative movement between the wiper 68 and the resistance element 69 stops.

The system will then remain in this steady state condition until one of the two command signals changes relative to the other. A change in either signal relative to the other will result in a chain of action as described above, and the wheel speeds on playback will follow exactly the wheel speeds on record. The speed of the left wheel is directly controlled by means of a command signal and a feedback signal, while the speed of the right wheel is controlled with respect to the speed of the left wheel, that is, by comparing the speed of the right wheel with the speed of the left wheel. Another way of looking at the operation is that the comparator circuit 52 and the motor 56 adjust both potentiometers 43 and 44 and the loads on the wheels 38 and 39, while the motor 74 offsets the adjustment of the potentiometer 43 from the potentiometer 44 by an amount proportional to the desired difference in wheel speed.

FIG. 6 illustrates an arrangement for connecting the servo motors 56 and 74 to the three potentiometers 43, 44 and 72. The apparatus shown in FIG. 6 may be mounted on a common frame (not shown) and comprises a gear 81 connected to the drive shaft of the servo motor 56, the gear 81 being connected to rotate the wiper 47 of the potentiometer 44 through another gear 82. The wiper 46 of the potentiometer 43 is also connected to be driven by the servo motor 56 by means of a gear 83 connected to the wiper 46, the gear 83 being connected to the gear 82 through a clutch 84 and a pair of pinions 86 and 87. The pinion 86 is connected to one side of the clutch 84 and to the gear 82, and the other pinion 87 of the pair is connected to the other side of the clutch 84 and to the gear 83. The ratios of the gears and pinions 81, 82, 83, 86 and 87 are such that the wipers 47 and 46 are rotated equal amounts by rotation of the servo motor 56, and the clutch 84 between the wipers permits adjustment of one of the wipers 46 and 47 relative to the other.

The servo motor 74 is connected to rotate the case including the resistance element 48 of the potentiometer 43 through a pinion and a gear 88 and 89, the pinion 88 being connected to the drive shaft of the motor 74 and the gear 89 being secured to the case of the potentiometer 43. The wiper 73 of the bridge potentiometer 72 is also connected to be rotated by the motor 74 by still another pinion 91 which meshes with the gear 89.

The servo motor 56, the case of the potentiometer 44, the motor 74 and the case of the potentiometer 72 are all secured to the previously referred to frame, while the gears and the case of the potentiometer 43 are all rotatably mounted on the frame. Electrical connections to the elements of the potentiometer 43 may be made through slip rings and brushes.

FIG. 3 illustrates a complete system for recording a number of motor vehicle characteristics in addition to wheel speeds, and FIG. 4 illustrates a complete playback system for testing a motor vehicle, utilizing the command signals recorded by the system in FIG. 3.

With reference to FIG. 3, in addition to the right wheel transducer 18 connected to the wheel 16, the left wheel transducer 19 is connected to the left wheel 17, and the recorder 32, the system further includes a tachometer generator 101 connected to the engine 10 for generating an engine speed signal. The output of the tachometer generator 101 is fed to a composite circuit 102 which, in addition to the modulator circuit 31 shown in FIG. 1, further includes an additional modulator having a carrier frequency of, for example, 12,000 c.p.s., for modulating the tachometer generator signal. The composite circuit 102 also includes conventional tone generators, a mixing circuit for combining all of the signals, and a power supply for the motors 25 of the transducers 18 and 19. A conductor 103 carries power from the composite circuit 102 to the motor of the transducer 19 and another conductor 104 carries this power from the composite circuit 102 to the motor of the transducer 18. In the event the motors 25 are conventional synchronous motors, the power supply may be 60 c.p.s. line voltage.

In addition to the engine speed signal generated by the tachometer generator 101, a manifold air pressure transducer 106 is also connected to the engine 10 and provides an output signal having a frequency which varies in accordance with variations in the manifold air pressure. A suitable type of manifold air pressure-to-frequency transducer is referred to in the previously mentioned Vanderbilt patent. The transducer 106 may be designed to have a center frequency at, for example, 4,700 c.p.s. and vary within a range of plus or minus 15% from the center frequency as the manifold air pressure changes. A gear shift transducer 107 connected to the transmission 11 and a gear shift lever 108 is also provided, the transducer 107 being connected to be responsive to the shift position of the transmission 11 and to produce a signal having a frequency of, for example, 3,000 c.p.s. the frequency varying within a range of plus or minus 15% in accordance with changes in the position of the transmission.

In addition to the foregoing transducers there may also be provided an ignition pickup device 109 a transmission reverse pickup device 111, and a detent pickup device 112. Conductors from the devices 109, 111 and 112 lead to the composite circuit which includes means for generating a tone signal for each of the devices. The ignition tone signal may be at a frequency of, for example, 80 c.p.s. and may be generated when the ignition is turned off, the reverse tone signal may be at a frequency of, for example, 40 c.p.s. and may be generated when the shift lever is placed in the reverse position, and the detent tone signal may be at a frequency of, for example, 120 c.p.s. and indicates the position of the transmission-throttle interconnecting linkage when the throttle is in the wide open position. The detent pickup device 112 may include a switch located adjacent the engine accelerator pedal, which may be actuated to energize the associated tone signal generator when the accelerator pedal is moved to the wide open position. The reverse device 111 also may include a switch which is actuated to energize the associated tone signal generator when the transmission is placed in the reverse position.

The output signals from the transducers 106, 107 and 19 are fed to a mixer circuit 113 which combines these signals and passes them to the composite circuit 102. The composite circuit 102 also receives the tachometer generator 101 output signal and the signal from the transducer 18, and these signals are mixed with the reverse, detent and ignition tone signals in the composite circuit 102, and the output of the circuit 102 is connected to the recorder 32 where the signals are recorded on a magnetic tape.

The playback system shown in FIG. 4 includes the apparatus referred to in FIG. 2, and in addition may include apparatus for starting the engine 34. The engine starting apparatus includes a logic starter circuit 116 which receives the ignition on-off signal on a conductor 117, the engine speed command signal on a conductor 118, and an engine speed feedback signal on a conductor 119. The logic starter circuit 116 is designed to start the engine 34 on command and shift control of the throttle of the engine 34 to the other recorded signals after the engine 34 has started. The shift of control will not occur if the engine 34 starts before the engine 10 started during the recording operation. Therefore, a time delay circuit 121 may also be provided, which allows for an arbitrary cranking period. If the engine does not start in this time, the tape is stopped and a signal light may be actuated, if desired. The output of the logic starter circuit 116 is connected to actuate a starter system switch 122 designed to start the engine 34 and temporarily control the throttle.

The playback system further includes a shift quadrant position-to-frequency transducer 123 which detects the position of the transmission 36 and generates variable frequency feedback signal which is indicative of the position of the transmission. It should be understood that all of the feedback signals vary in the same manner and range as the associated command signals from the record system shown in FIG. 3. The feedback signal from the transducer 123 is fed to a frequency comparator circuit 124 which also receives the gear shift command signal from the signal conditioner 50. The error signal from the frequency comparator circuit 124, if there is one, is amplified by a conventional power amplifier 126 and fed to a servo motor 127, which is connected to change gears in the transmission 36. The motor 127, of course, also controls the transducer 123 which responds to any change in the gear shift position.

The reverse and detent tone command signals are fed to two conductors 128 and 129, respectively, which lead to the transmission 36. As previously explained, the detent command signal indicates whether the accelerator pedal has been pushed wide open, and the reverse tone command signal indicates whether the gear shift lever has been placed in the reverse position. The shift quadrant position transducer 123 also indicates whether the gear shift lever is in reverse, but the provision of an additional reverse tone signal provides an added safety feature. The reverse tone signal may be connected to actuate a safety pin which must be actuated before the transmission may be shifted to the reverse position by the motor 127.

Also connected to the engine 34 are a manifold air pressure-to-frequency feedback transducer 131 and a tachometer generator 132 which indicates engine speed. The manifold air pressure feedback signal from the transducer 131 is fed to another frequency comparator circuits 133 along with the command manifold air pressure signal from the signal conditioner circuit 50, and the feedback signal from the tachometer generator 132 is fed to still another frequency comparator circuit 134 along with the command speed signal from the signal conditioner circuit 50. The error signals from the two frequency comparator circuits 133 and 134 are added together and used to control the throttle setting of the engine 34. The error signal from the frequency comparator circuit 134 is fed through a signal clamping circuit 136 and a resistor 137 to an adding circuit 138 which also receives the error signal from the frequency comparator circuit 133. The combined error signal from the circuit 138 is amplified by a power amplifier 139 and fed to a servo motor 141 which controls the position of the wiper 142 of a potentiometer 143. The end terminals of the resistance element 144 of the potentiometer 143 are connected to a power supply, which may be the reference voltage. The voltage appearing on the wiper 142 is connected to an adding circuit 146, and the output of the circuit 146 is amplified by a power amplifier 147 and connected to drive still another servo motor 148 which controls the setting of the throttle 149 of the engine 34. Connected to the throttle 149 is another potentiometer 151, the wiper 152 of the potentiometer 151 being connected to be moved by the servo motor 148, and the resistance element 153 being connected across the same power supply used for the potentiometer 143. The signal appearing on the wiper 152 of the potentiometer 151 is also fed to the adding circuit 146 where it is combined with the voltage appearing on the wiper 142 of the potentiometer 143, combined signal at the output of the adding circuit 146 being used to drive the servo motor 148 which controls the position of the throttle 149 of the engine 134.

It will be apparent therefore that the playback system shown in FIG. 4 will duplicate in practically all respects the engine operating conditions which occurred during the recording operation using the system shown in FIG. 3. If during the playback operation, there is an error due to the transmission 36 shifting at a different point from the transmission 11 during record operation the engine speeds will be different. If the playback speed does not match the recorded speed an override speed error signal causes the transmission to shift. This may be accomplished by closing the throttle slightly if the engine speed is above the recorded command speed, and opening the throttle slightly if the speed is below the recorded command speed. The portions of the systems shown in FIGS. 3 and 4 for controlling the dynamometers and the speeds of the two wheel connected to the differential operate in the manner described with regard to FIGS. 1 and 2. It should be apparent that other quantities may be controlled using the systems. For example, two motors which are related or which are coupled together in some manner may be controlled to operate in unison or at somewhat different and varying speeds. In the event the difference in speed, or whatever quantity is being controlled, should not be permitted to become too great, stops on the potentiometers 43 and 44 may be provided to limit the difference in movement.

It should also be understood that some variations may be made in the system without departing from the scope of the invention. For example, a mechanical differential may be provided to control the right wheel dynamometer potentiometer instead of making the case of the potentiometer movable.

I claim:

1. Apparatus for controlling first and second mutually interdependent related similar qualities the value of one of which depends at least on the value of the other, comprising a source of first and second command signals, said first and second command signals being indicative of the desired conditions of said first and second qualities respectively, means for comparing said first and second command signals and providing a difference signal, means responsive to said first command signal for controlling said first quality, and comparator means responsive to said first command signal and said difference signal for controlling said second quality.

2. Apparatus as in claim 1, where said first and second qualities are dependent upon a third quality, and said source of command signals provides a third command signal indicative of the desired condition of said third quality, and further including means responsive to said third command signal for controlling said third quality, said last mentioned means thereby cooperating with said first and second command signals in controlling said first and second qualities.

3. Apparatus for controlling first and second mutually interdependent related similar qualities the value of one of which depends at least on the value of the other, comprising a source of first and second command signals, said first and second command signals being indicative of desired conditions of said first and second qualities respectively, first and second control devices for varying said first and second qualities respectively, actuating means responsive to said first command signal for actuating said first control device to a first condition, means for comparing said first and second command signals and providing a command difference signal, and comparator means responsive to said command difference signal and to said first command signal for actuating said second device to a condition which is offset with respect to said first device condition by an amount that is proportional to said difference signal.

4. Apparatus as in claim 3, and further including means responsive to said first quality for providing a first feedback signal indicative of said first quality, means responsive to said second quality for providing a second feedback signal indicative of said second quality, said actuating means responsive to said first command signal also being responsive to said first feedback signal and actuating said first control device such as to eliminate any difference between said first command signal and said first feedback signal, means for comparing said first and second feedback signals and providing a feedback difference signal, said comparator means also being responsive to said feedback difference signal to equalize said feedback difference signal and said command difference signal.

5. Apparatus as in claim 4, wherein said first and second qualities are dependent upon a third quality, said source also providing a third command signal indicative of the desired condition of the third quality, and further including means responsive to said third command signal for controlling said third quality, said last mentioned means thereby cooperating with said first and second control devices in controlling said first and second qualities.

6. Apparatus as in claim 5, wherein said first and second qualities are the rates of rotation of first and second members, and said third quality is the rate of rotation of a third member which is coupled in drive relation with said first and second members.

7. Apparatus for controlling the speeds of first and second members, said members being coupled together but said speeds being variable relative to each other, comprising a source of first and second command signals, said first and second signals being indicative of the desired speeds of said first and second members respectively, means responsive to the speed of said first member for providing a first feedback signal which is indicative of the speed of said first member, means responsive to the speed of second member for providing a second feedback signal which is indicative of the speed of said second member, means for comparing said first and second command signals and providing a command difference signal, means for comparing said first and second feedback signals and providing a feedback difference signal, means for comparing said command difference signal and said feedback difference signal and providing a difference error, means for comparing said first command signal and said first feedback signal and providing a first error signal, means responsive to said first error signal for controlling the speed of said first member in such a manner as to eliminate said first error signal, and means responsive to said first error signal and to said difference error for controlling the speed of said second member in such a manner as to eliminate said difference error.

8. Apparatus as in claim 7, wherein said first member is a wheel of a motor vehicle and said second member is another wheel of said motor vehicle, said wheels being coupled together through a differential which is connected in driving relation with the vehicle engine, and wherein said source further provides a third command signal which is indicative of the desired speed of the motor vehicle engine, and further including means responsive to said third command signal for controlling the speed of the motor vehicle engine and thereby cooperating in controlling the speeds of said wheels.

9. Apparatus for controlling the speeds of first and second wheels of a motor vehicle, said wheels being coupled together through a differential and said speeds being variable relative to each other, comprising a source of first and second command signals, said first and second signals being indicative of the desired speeds of said first and second wheels respectively, means responsive to the speed of said first wheel for providing a first feedback signal which is indicative of the speed of said first wheel, means responsive to the speed of second wheel for providing a second feedback signal which is indicative of the speed of said second wheel, means for comparing said first and second command signals and providing a command difference signal, means for comparing said first and second feedback signals and providing a feedback difference signal, means for comparing said command difference signal and said feedback difference signal and providing a difference error, means for comparing said first command signal and said first feedback signal and providing a first error signal, means responsive to said first error signal for controlling the speeds of said first and second wheels in such a manner as to eliminate said first error signal, and means responsive to said difference error for offsetting the speed of said second wheel with respect to said first wheel by an amount that is proportional to said command difference signal.

10. Apparatus as in claim 9, wherein said source further provides signals which are respectively indicative of the desired manifold air pressure and the gear shift mechanism of the motor vehicle, and further including means respectively responsive to the last mentioned signals for controlling the throttle and the gear shift mechanism of the motor vehicle.

11. Apparatus as in claim 10, wherein said source further provides an ignition signal, an engine speed signal, a reverse signal and a detent signal, and further including means respectively responsive to the last mentioned signals for activating the ignition, the throttle in cooperation with said manifold air pressure signal, a reverse safety device, and a detent responsive device.

References Cited

UNITED STATES PATENTS

| | | | |
|---|---|---|---|
| 2,130,833 | 9/1938 | Bennett | 73—123 X |
| 2,130,900 | 9/1938 | Presbrey | 73—117 |
| 3,099,154 | 7/1963 | Vanderbilt | 73—116 |

RICHARD C. QUEISSER, *Primary Examiner.*

JAMES GILL, *Examiner.*

JERRY W. MYRACLE, *Assistant Examiner.*